Oct. 19, 1965  F. A. SCHWERTZ  3,213,429
HIGH SPEED INFORMATION RECORDER
Filed May 24, 1963
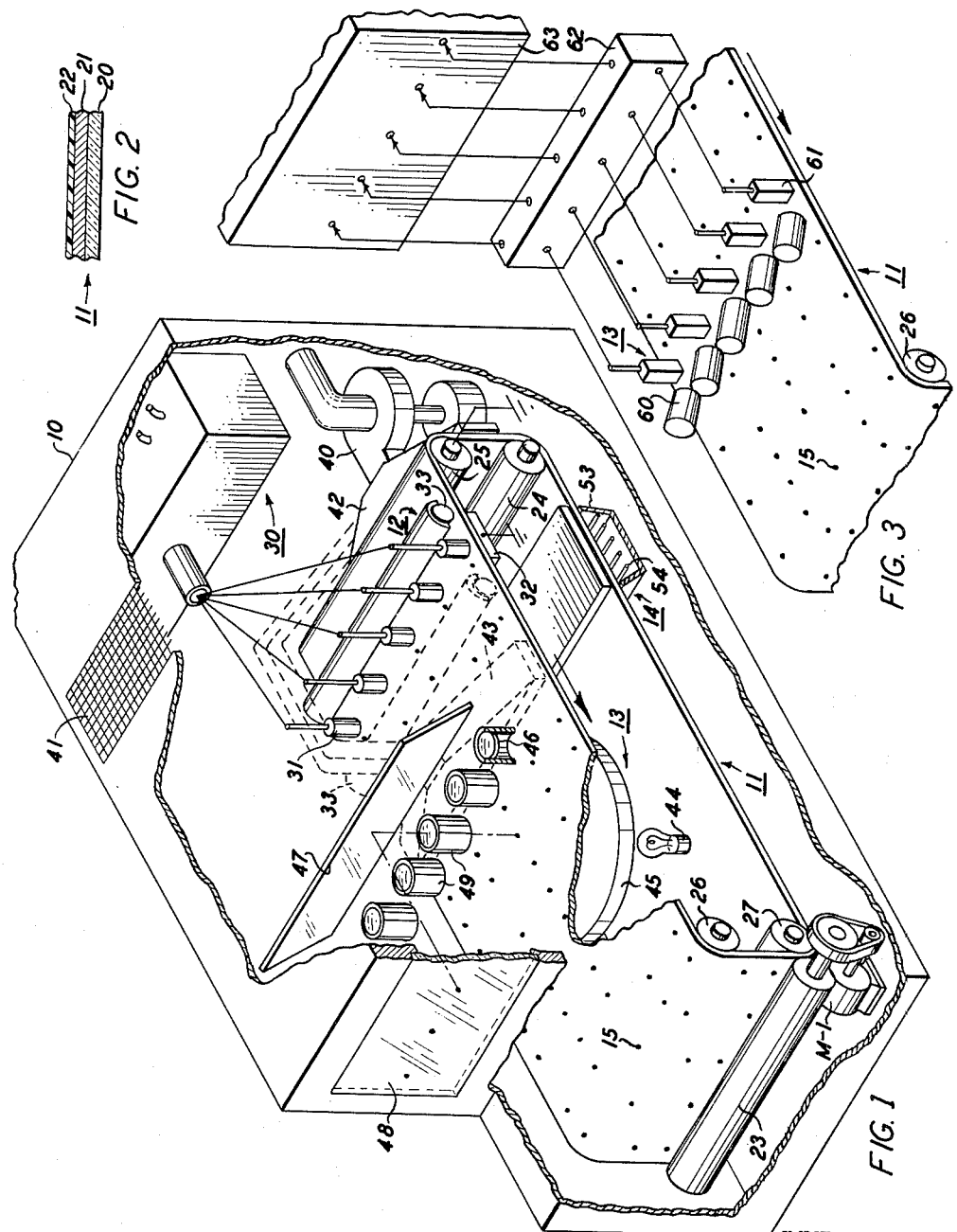
INVENTOR.
FREDERICK A. SCHWERTZ
BY
Stanley Z. Cole
ATTORNEY

3,213,429
HIGH SPEED INFORMATION RECORDER

Frederick A. Schwertz, Pittsford, N.Y., assignor to Xerox Corporation, Rochester, N.Y., a corporation of New York
Filed May 24, 1963, Ser. No. 283,074
8 Claims. (Cl. 340—173)

This invention relates to a novel method and apparatus for the recording and readout of information intelligence. More specifically, the invention relates to a rapidly operable inertialess recording system having optical readout of visible images representative of the information recorded.

With an ever increasing technology and the introduction of computational machines, computers and the like which produce data at high rates of speeds, there has arisen a concomitant need for high speed recording devices, for otherwise the recording mechanism may act to retard the operation of the entire system. In the usual optical readout system in which it is desired to make visible the recordings of information intelligence in recognizable graphic or codified form, visibility is usually achieved by a development step following a latent image formation on a sensitive recording member. Typically, recording procedures may include the well known systems of photography or xerography including optical and non-optical recording methods. Forms of the latter employing charge transfer techniques are disclosed, for example, in U.S. Patents 2,825,814; 2,919,967; 3,015,304; 3,023,731; 3,050,580; 3,064,259; and 3,068,481.

Because recording in each of these various systems utilizes an initially formed latent image of the information, there is an inherent time lag between the recording and visible presentation for readout purposes attributed to delays of development. While it is desirable to reduce the time lag to a minimum in order that information intelligence be instantly available for utilization, each of these systems is handicapped by the necessary time limits imposed by the development step. At the same time, the materials employed for these prior type systems including those systems in which recording is in the form of surface degradation of a member such as Teledtose type paper, being a trade name for a facsimile or digital recording medium, as well as other forms of paper, are generally non-reusable but rather consumable which inherently contributes substantially toward the operating costs of these systems.

Now in accordance with the instant invention, there is provided a novel method and apparatus for inertialess recording and readout of information intelligence in which readout is available with a minimum of time lag almost instantaneously following recording. Further in accordance with the invention, recording and readout are achieved on reusable, substantially non-consumable materials thereby affording a substantial economic advantage over prior type systems particularly with significant or high output systems.

It is therefore an object of the invention to provide novel method and apparatus to record and optically readout information intelligence more rapidly and more efficiently than heretofore.

It is a further object of the invention to provide novel method and apparatus to achieve optical readout of information intelligence with a minimum of time lag approaching zero following recording.

It is a further object of the invention to provide novel method and apparatus for continuous recording and readout of information intelligence with substantially non-consumable materials.

It is still a further object of the invention to provide novel method and apparatus by which recorded information can be optically readout for visible display or machine readout purposes.

These and other objects of the invention are attained in accordance with an embodiment of the invention in which a non-optical recording is achieved in the form of electrostatic discharge onto a continuous deformable layer that is selectively "frosted" or rendered "frosted" in response to said discharge. As will be more fully described below and as disclosed in copending application, Serial No. 193,273 filed May 8, 1962, in the name of Gunther et al., certain insulators when electrostatically charged in image configuration will under appropriate operating conditions of temperature or a suitable application of solvent take on a microscopically uneven surface which can be described as rippled, strippled, reticulated, wrinkled, or "frosted." This local deformation takes on a milky apperance in proportion to the amount of illumination received in different areas. The frost formation is generally comprised of alternating ridges and valleys that recur at substantially uniform spacing with recurrently variable width and/or height and which scatter light rather than specularly reflecting or transmitting it.

Whereas frost will be most prominently mentioned as the form of deformation usable with the invention, other types of deformation may occur and are usable herewith. Thus, fringing fields are known to exist at the edge or boundary separating charged and uncharged areas and these fields are capable of causing a liquid or deformable layer to form a "relief" pattern at such boundaries. Such patterns can generally be eliminated or minimized by softening the deformable material just sufficiently and just long enough for the frost pattern to appear. However, with some deformable materials relief images may be preferred in that they impose fewer limitations on the choice of the deformable layer.

The various features, advantages and limitations of the invention will become apparent from the following description and drawings in which:

FIG. 1 is an isometric embodiment of an apparatus operative in accordance with the invention;

FIG. 2 is a sectional fragmentary view through the recording member; and,

FIG. 3 is a fragmentary isometric view illustrating a readout variation of the embodiment of FIG. 1.

Referring now to FIG. 1, the apparatus of the invention includes an exterior cabinet 10 for housing the components therein comprised generally of a recording member 11 on which to record and readout information, a recording station 12, a readout station 13 and an erase station 14.

The recording member 11 (see also FIG. 2) is shown in the form of an endless tape comprised of a substrate that includes a base material 20 supporting a conductive coating 21 both of which in the preferred embodiment are transparent, although they need not be, and supporting as a top layer a thin deformable thermoplastic layer 22. For some purposes, as in digital tape applications, the tape need not be endless. Suitable substrates include metal sheets and foils generally in the range of about ¼ to 2 mils in thickness and including such materials as aluminum, brass, or other metals, metallized paper, glass with a transparent conductve coating as well as heat resistant plastics such as polyethylene terephthalate with a conductive coating thereover.

Layer 22 comprises a thin layer of material which is normally solid and electrically insulating but which may be temporarily softened by the application of heat, solvent vapors, or the like. The layer 22 may be opaque when viewed by reflection only, otherwise it should be and normally is relatively transparent. For illustrative purposes, layer 22 may be considered a layer of thermoplastic resin approximately 2 to 5 microns thick, having a generally smooth surface and applied by coating, roll coating, wiping or other conventional procedures.

The deformable thermoplastic layer 22 may comprise almost any electrically insulating thermoplastic resin capable of being softened at a moderate temperature and characterized by the ability to retain an electrostatic charge at such a temperature. Many materials have been found which are suitable for forming layer 22 and which are suitable for use with solvent vapor softening procedures as well as heat softening as will be described. Table I below is a partial list of such materials:

*Table I*

| Tradename | Chemical Type | Manufacturer |
| --- | --- | --- |
| (1) Piccotex | | Pennsylvania Industrial Chemicals Co. |
| (2) Piccolyte | Terpene resin | Do. |
| (3) Staybelite 5 | Rosin ester | Hercules Powder Co. |
| (4) Staybelite 10 | do | Do. |
| (5) Piccoumaron | Coumaron | Pennsylvania Industrial Chemicals Co. |
| (6) Piccolastic D150 | Styrene | Do. |
| (7) Piccoflex 100A | Polyvinyl chloride | Do. |
| (8) Neville R13 | Coumarone indene | Neville Chemical Co. |
| (9) Nevillac soft | Phenol modified coumarone indene. | Do. |
| (10) Piccolastic E125 | Styrene | Pennsylvania Industrial Chemicals Co. |
| (11) Piccolastic D125 | do | Do. |
| (12) Picco 75 | Indene | Do. |
| (13) Piccopale 70 | Hydrocarbon (unsaturated). | Do. |
| (14) Piccolastic A-50 | Styrene | Do. |
| (15) Piccolastic A-75 | do | Do. |

As can be seen by further reference to the drawings, the recording tape 11 is caused to be advanced continuously by means of a motor drive M-1 connected to a drive roll 23 whereby to move the tape over guide rolls 24, 25, 26 and 27 past the recording, readout, and erase stations at a substantially uniform rate of speed.

Recording station 12 includes an information intelligence output 30 that may include various registers, converters, comparators, counters or the like, that receive information from an external source such as a computer or the like. The information is emitted from the output, for example, as disclosed in patents U.S. 2,919,967 and 3,064,259 and is adapted to selectively pulse different combinations of the electrodes 31, contained in an array, in correlation to the information output as in a line-by-line recording. The electrodes may have various geometric configurations for codified recording including shaped characters, binary code, point electrodes or the like. Below and in contact with the tape in parallel alignment with the electrode array is a conductive backing plate 32, which may be grounded. The electrodes may also be operable in a motionless system as described for example in my copending application, Serial No. 638,008, filed February 4, 1957.

In accordance with the invention, each pulsing of an electrode causes non-sparking electrical discharge onto the tape surface placing that corresponding area of the tape surface under an electrical stress. This is achieved by applying a voltage that exceeds the critical stress which is defined as that value of electric field strength at which breakdown occurs. It has been found that when there is such breakdown, a transfer or charge migration takes place. If, on the other hand, an electric stress is below the critical point, dielectric breakdown is not effected and there is no charge transfer. The level at which the charge will transfer can be determined empirically or by the use of critical stress curves. Basic to the present invention is the fact that the thermoplastic, which optically can be precharged to some value below the critical value as to reduce the pulse voltage necessary to achieve breakdown, is charged by means of a triggering voltage to the electrode to raise the electrode charge above the critical value.

Electric stress through the thermoplastic layer may be determined by dividing the magnitude of potential applied thereacross by the quotient of the thickness of the material divided by the dielectric constant thereof. Since the dielectric material is separated from electrode 31 by an air gap having a dielectric constant of one, the field applied through the gap is found by dividing the voltage across the gap by the thickness thereof.

The charge thus emitted by the electrodes as will be more fully discussed below, deposits onto the tape surface either to frost the tape immediately or render the tape capable of being frosted depending on the relative location of the heat source in the form of a lamp 33.

In order to produce the frost pattern from the effects of the electrode discharge so that the thermoplastic becomes physically altered by the mechanical forces associated with the charge thereof, the tape must be rendered soft immediately preceding or following the electrostatic discharge. This may be accomplished in accordance with the invention by means of a high energy tubular type flash lamp designated 33 having relatively high heat output such as a Xenon high pressure capillary lamp which is commercially available, and which operates in timed relation to the movement of the tape. The lamp is arranged to extend transversely across the tape width and is supported closely adjacent to the surface thereof in order to effect softening without increasing the electroconductivity to a level at which electrical charges would leak away or become dissipated, as more fully disclosed in the above cited copending Gunther application.

The lamp is shown solid in the preferred position preceding the electrodes in the direction of tape movement. Optionally, it may be placed in the position shown dashed although this latter position will cause a fractional time delay in readout as will be understood. Placed in either position, energizing of the lamp causes sufficient softening of the deformable layer such that the surface area affected by electrostatic discharge will initiate a flow in response to the charges acted upon causing the frosted milky appearance in proportion to the amount of charge.

It is generally desired after forming the frosted image to effect "freezing" the pattern in place and avoid self erasure. To effect image hardening, a blower designated 40 drawing air (preferably filtered to prevent dust accumulation and contamination) into the cabinet can be employed to discharge air through a duct 43 (shown dashed) against the tape surface to expedite hardening. Pressurizing the cabinet serves also to prevent dust infiltration. However, to further reduce the time lag between recording and readout as will be described, readout can take place substantially instantaneously following the image formation without prior hardening before self erasure has had time to take place. This is so since layer 22 will generally remain soft long enough following electrical discharge to permit frosting to take place and be retained for immediate viewing or projection.

The readout station 13 is preferably located as physically close to the recording station as possible in order to minimize time loss between the two operations. Readout in this embodiment is effected by optical transmission of the frosted image produced at the recording station onto a ground glass or the like, 48. To effect readout for visible viewing, the readout station includes a light source 44 and a condensing lens 45 directing a converging beam of light onto the tape 11. In the absence of a frosted image optically thereabove, a collimated beam of light passes through each of projection lenses 46 which align with each line of image formation onto a mirror 47 and onto ground glass 48. A tubular shield 49 is provided surrounding and extending downward from each of the lenses 46 to prevent scattered light from reaching the ground glass 48. Therefore, as the frosted areas representative of the information intelligence passes optically below their corresponding lenses, the scattered light is prevented from imaging onto the ground glass 48 to produce a dark spot thereon instead.

A Schlieren optical system may also be employed. The frosted recordings of the present invention, however, produce gross scattering or deflection of light and therefore does not require the use of a relatively sensitive, complex and expensive Schlieren optical system. Where the various layers comprising recording tape 11 are opaque instead of transparent, the frosted image may also be viewed by reflected light methods. Frosted areas may show a density on the order of 1.5 in such apparatus.

In accordance with the embodiment of the invention being described, it is desired that the recorded frost image will not be permanent and therefore, it becomes necessary to effect erasure which is performed at the erasure station 14. Thus, the erasure station can employ similar procedures as used for softening layer 22 initially, as by again heating or exposing the tape to solvent vapors. As shown, erase station 14 includes an oven-type heating chamber 53 having radiant transversely extending electrically energized heating coils 54. The tape in this operation is heated to a temperature to intentionally effect excessive softening so that all electrical forces are quickly dissipated.

Following erasure, the tape can be quickly hardened in prepartion for recycling as by a blast of air (preferably filtered) directed to the tape surface from blower 40 via plenum duct 42. Grille 41 provides an air relief from the cabinet. Therefore as described above the cycle of recording and readout is continuous, rapid and without any consumption of materials.

Referring now to FIG. 3, there is disclosed an alternate readout system to that described in the embodiment of FIG. 1. According to the embodiment hereof, there is provided a lamp 60 associated in a line with each line of image recordings formed by the respective electrode on the surface of tape 11 and supported above the tape to emit a light beam discharging about 45 degrees incident to the tape surface. Light from the lamp is reflected from the tape surface into an associated photocell 61 aligned with each line of image recordings. In the absence of a frost recording below the respective photocell, the light intensity thereto is constant to effect a constant electrical emission therefrom. As the frosted recordings pass beneath the incident light beam, the scattering properties of the image cause a reduced light intensity at the photocells which thereupon emit a discrete change in electrical value constituting a signal input to register 62 or the light. These signals may comprise distinguishable information intelligence fed to a memory circuit of a computer 63, for visual display by means of a cathode ray tube, facsimile transmission or the like. The tape therefore acts as a buffer storage between the information output system 30 and the input memory circuit and, as before, is available within a time delay asymptotically approaching zero following recording. The readout produced thereby can obviously be utilized for other forms of machine, electronic or electrical input as are well known in the art.

In order to provide a little better understanding of the principles of frosting herein, the following further explanation is offered. The probable theoretical explanation of frosting and requirements therefor are more fully discussed in the copending Gunther application above referred to. Localized deformation occurs, it is believed because the electrostatically charged surface of layer 22 is inherently unstable, i.e., the layer is in a lower energy condition when in a frosted or roughened condition than when it is smooth.

Generally, the frost patterns are formed by application of a voltage that is generally approximately proportional to the square root of the thickness of the deformable layer. The frosted pattern consists mostly of reasonably randomly distributed depressions and ridges which recur at a substantially uniform spacing, and have a somewhat recurrently variable width and/or height with a periodicity defined as the ridge-to-ridge or trough-to-trough spacing. The ridge-to-ridge spacing at the onset of frost has been found to be substantially equal to the thickness of the deformable layer only and the frost pattern bears very little relationship on the microscopic level to the configuration of the electrostatic pulse which causes it. With thin deformable layers on the order of few microns or less, the ridge-to-ridge spacing increases to above five times the layer thickness as frosting becomes more pronounced. This effect diminishes with an increasing layer thickness and at about 100 microns the ridge-to-ridge spacing is about equal to the thickness for any degree of frosting. It is believed that randomly occurring circular patterns found in the pattern are largely caused by dust particles or other localized imperfections in the deformation layer. Where the deformable layer overlies a striated surface such as a buffed metal, the frost pattern will be largely parallel to the striations. The depth of the depressed areas is controllable and varies in accordance with the magnitude of the electrostatic charge.

Frost density is also influenced by heating time, tempertaure, thickness and various other factors much as a density of a photographic film is influenced by the type of film and the processing procedures as well as by the amount of exposure (in this case charge) received. In general, it has been found that surface frosting does not take place or at least is not readily observable when layer 22 is much less than ½ micron in thickness. As layer 22 is increased in thickness, the frosted area changes appearance from a very fine-grained frosting to a relatively coarse grained bubbly appearance and eventually becomes difficult to observe in the presence of naturally occurring surface imperfections. Frosting however, has been observed with layers in excess of 100 microns in thickness. Certain materials with sharp melting points, such as certain waxes, are poorly suited for the thermoplastic layer because it is impractical to bring them to a viscous, as opposed to a watery condition.

As to the nature of the field discharge employed herein to charge the deformable layer, it is believed that the field discharge in the air gap between the electrode surface and the tape is such that when critical stress is attained, ions which normally are present in the gap are accelerated into collision with nearby air molecules thereby generating additional ions which similarly collide with molecules to create more ions, this action being cumulative. The use of ultra violet light in the air gap is known to expedite the onset of discharge. Charges are also released from the surfaces defining the gap by collisions with these surfaces by the moving ions. The traveling ions so produces deposit on the surface that is controlled by the electric field.

Since the ions created by the electric field are both positive and negative in polarity, the positively charged ions are propelled to the negative surface, whereas the negatively charged ions move to the positive electrode. This results in deposition of charge on the insulating film between the electrodes. Where there exists negative charges on an insulating surface and positive charges are moved thereto, neutralization takes place and the charge density of the negative surface is reduced. But if the surface is initially neutral, charges are moved thereto by the electric field in the gap, and the deposition of additional or new charges takes place on the surface without neutralization, thereby raising the charge density as controlled by the field on the previously neutral surface. The important consideration for the purposes of this invention is that the insulating film is positioned in the gap to receive and store the charges. As such, it might be self-supporting or it might be a coating over one of the electrodes, such as a conductive backed frostable layer.

Thus air ionization, which takes place in the gap, creates a conductive region and allows charge flow between the surfaces defining the gap to effect a charge migration therebetween. This type of air ionization and charge travel continues while the electric stress is above critical stress, but for a value below critical stress, it has been found that once current flow through ion movement in the gap has started, and as deposition on an insulating surface takes place, electric stress in the gap is reduced by the retention of charges which changes the field strength across the gap and stops charge migration.

It is known that if an electrode of any configuration is disposed a short distance above in an insulating surface and the latter is supported by a grounded metal plane, a potential applied between the electrode and the grounded plane sufficient to generate ionization in the air gap causes an electrostatic charge of the shape of the electrode to appear on the insulating surface. Depending on the polarity of the applied potential, the electrostatic image is either positively or negatively charged. In either event, the image may be rendered usable as in the invention by development as by softening of the deformable layer as aforesaid.

It is also known that under proper conditions, legible images can be obtained by charge transfer through air gaps as great as ten thousandths of an inch provided sufficiently large voltage pulse is applied, the voltage requirement ranging from several hundred to several thousand volts, depending upon the separation of the electrodes. Short voltage pulses of this high amplitude are difficult to generate and control, and therefore can be avoided by either prestressing the web to a uniform potential just below the critical value or by maintaining close distance spacing between the electrodes and the web surface on the order of approximately 0.001″–0.005″.

The electrodes may have character shapes to be adapted for binary type recording systems or may be used to record a time varying analog voltage or the like, recording being accomplished by first translating the analog voltage input in a suitable converter to a digital equivalent. Since the electrode structure per se does not constitute the invention hereof, any system known in the art to produce a non-sparking electrical discharge representative of information intelligence onto recording member 11 may be employed.

By the above description there is disclosed a novel system for recording and readout of information intelligence and adapted for high speed inertialess operation having a virtually imperceptible time lag between the recording and readout operations. At the same time there is employed a non-consumable, reusable recording member affording a highly advantageous economic advantage over any known systems of the prior art.

Since many changes can be made in the above construction and many apparently widely different embodiments of this invention can be made without departing from the scope thereof, it is intended that all matter contained in the drawings and specification shall be interpreted as illustrative and not in a limiting sense.

What is claimed is:

1. Intelligence apparatus comprising:
   (a) support means supporting a web on which intelligence is to be recorded, said web comprising a normally solid, electrically insulating thermoplastic layer 2 to 5 microns in thickness capable of being physically deformed on a surface into optically discernible patterns in response to a high voltage from a closely spaced electrode;
   (b) drive means to advance said web at a substantially uniform rate;
   (c) electrode recording means comprising a linear array of individual electrodes spaced up to 0.005 inch from and a grounding electrode aligned opposite to the surface of said web and extending substantially in a line transverse to the path of web movement as to be adapted for line-at-a-time recording;
   (d) means to electrically pulse the individual electrodes of said recording means to deposit a non-sparking, electrode shaped charge line-by-line on the web in accordance with intelligence to be recorded;
   (e) a high energy linear extending heat emission means arranged substantially parallel to said electrode recording means juxtaposed to the web surface and to said electrodes and operative in timed relation to the operation of said recording means to condition said web whereby said charge forms an optically discernible pattern in said web in areas corresponding to the intelligence; and,
   (f) means to effect detection of said intelligence for reading out the information recorded.

2. The apparatus according to claim 1 wherein said means to effect detection means comprises optical means for transmitting the recorded information onto an externally located display viewing surface.

3. The apparatus according to claim 1 wherein said means to effect detection includes transmission means to a cathode ray tube for information display thereon.

4. Intelligence apparatus comprising:
   (a) support means supporting a web on which intelligence is to be recorded, said web comprising a normally solid, electrically insulating thermoplastic layer 2 to 5 microns in thickness capable of being physically deformed into patterns of alternating ridges and valleys and supported on a conductive substrate;
   (b) drive means to advance said web at a substantially uniform rate;
   (c) a linear array of individual electrodes spaced up to 0.005 inch from and a grounding electrode aligned opposite to the surface of said web and arranged extending substantially in a line transverse to the path of movement thereof;
   (d) means to electrically pulse selective of said electrodes in said array line-by-line in an electrode arrangement representative of intelligence to be recorded whereby a gaseous electrode shaped electrical discharge is effected between the pulsed of said electrodes and the surface of said web;
   (e) a high energy linear extending heat emission means arranged substantially parallel to said electrodes juxtaposed to the web surface and to said electrodes and operative in timed relation to the operation of said electrodes to condition said web whereby said gaseous discharge forms a pattern of alternating ridges and valleys in said web surface in areas thereon corresponding to the relationship of said pulsed electrodes; and,
   (f) optical means to effect optical projection from said web surface whereby said pattern is visibly intelligible for reading out the information recorded.

5. Intelligence readout apparatus comprising:
   (a) support means supporting a web on which intelligence is to be recorded, said web comprising a normally solid, electrically insulating thermoplastic layer 2 to 5 microns in thickness capable of being physically deformed on a surface into patterns of alternating ridges and valleys and supported on a conductive substrate;
   (b) drive means to advance said web at a substantially uniform rate;
   (c) a linear array of individual electrodes spaced up to 0.005 inch from and a grounding electrode aligned opposite to the surface of said web and arranged extending substantially in a line transversed to the path of movement thereof;
   (d) means to electrically pulse selective of said electrodes in said array line-by-line in an electrode arrangement representative of intelligence to be recorded whereby a gaseous electrode shaped electrical discharge is effected between the pulsed of said electrodes and the surface of said web;

(e) a high energy linear extending heat emission means arranged substantially parallel to said electrodes juxtaposed to the web surface and to said electrodes and operative in timed relation to the operation of said electrodes to condition said web whereby said gaseous discharge forms a pattern of alternating ridges and valleys in said web surface in areas thereon corresponding to the relationship of said pulsed electrodes;

(f) optical means to effect optical projection from said web surface whereby said pattern is visibly intelligible for reading out the information recorded; and, (g) erasure means operative following readout to erase previously recorded patterns from said web and condition the web for subsequent recording and readout.

6. The apparatus according to claim 5 wherein said heat emission means comprises a high energy flash lamp.

7. Intelligence readout apparatus comprising:

(a) support means supporting a web on which intelligence is to be recorded, said web comprising a normally solid, electrically insulating thermoplastic layer 2 to 5 microns in thickness capable of being physically deformed on a surface into patterns of alternating ridges and valleys and supported on a conductive substrate;

(b) drive means to advance said web at a substantially uniform rate;

(c) a linear array of individual electrodes spaced up to 0.005 inch from and a grounding electrode aligned opposite to the surface of said web and arranged extending substantially in a line transverse to the path of movement thereof;

(d) means to electrically pulse selective of said electrodes in said array line-by-line in an electrode arrangement representative of intelligence to be recorded whereby a gaseous electrode shaped electrical discharge is effected between the pulsed of said electrodes and the surface of said web;

(e) a high energy linear extending heat emission means arranged substantially parallel to said electrodes juxtaposed to the web surface and to said electrodes and operative in timed relation to the operation of said electrodes to condition said web whereby said gaseous discharge forms a pattern of alternating ridges and valleys in said web surface in areas thereon corresponding to the relationship of said pulsed electrodes; and, (f) photoelectric means responsive to said recorded patterns to emit discreet signals intelligible as information intelligence to external utilization apparatus.

8. The apparatus according to claim 7 wherein said responsive photoelectric means comprise at least two separate elements supported immediately adjacent past said electrodes in the direction of web movement.

References Cited by the Examiner

UNITED STATES PATENTS

| | | | |
|---|---|---|---|
| 2,391,451 | 12/45 | Fischer | 178—7.5 |
| 2,813,146 | 11/57 | Glenn | 178—5.4 |
| 2,927,959 | 3/60 | Mast | 178—7.5 |
| 2,985,866 | 5/61 | Norton | 340—173 |

IRVING L. SRAGOW, *Primary Examiner.*